United States Patent
Matsuda et al.

(10) Patent No.: US 8,516,559 B2
(45) Date of Patent: Aug. 20, 2013

(54) CONTENT PROCESSING SYSTEM, CONTENT PROCESSING METHOD, COMPUTER PROGRAM, RECORDING MEDIUM, AND PORTABLE TERMINAL

(75) Inventors: Hideki Matsuda, Fujimi (JP); Yoshiyuki Kodama, Chino (JP)

(73) Assignee: Seiko Epson Corporation (JP)

( * ) Notice: Subject to any disclaimer, the term of this patent is extended or adjusted under 35 U.S.C. 154(b) by 266 days.

(21) Appl. No.: 13/016,091

(22) Filed: Jan. 28, 2011

(65) Prior Publication Data

US 2011/0219435 A1    Sep. 8, 2011

(30) Foreign Application Priority Data

Mar. 3, 2010 (JP) .................................. 2010-047033

(51) Int. Cl.
*H04L 9/32* (2006.01)

(52) U.S. Cl.
USPC ........ 726/5; 726/2; 726/3; 380/270; 709/214; 709/217; 709/218; 709/219

(58) Field of Classification Search
USPC ................. 726/5, 2, 3; 709/214, 217–219; 380/270
See application file for complete search history.

(56) References Cited

U.S. PATENT DOCUMENTS

| | | | | |
|---|---|---|---|---|
| 5,870,547 A * | 2/1999 | Pommier et al. | ............... | 709/204 |
| 5,938,724 A * | 8/1999 | Pommier et al. | ............... | 709/205 |
| 7,350,704 B2 * | 4/2008 | Barsness et al. | ............... | 235/435 |
| 7,865,567 B1 * | 1/2011 | Hendricks et al. | ............ | 709/214 |
| 7,937,091 B2 * | 5/2011 | Roman et al. | ................. | 455/454 |
| 8,037,094 B2 * | 10/2011 | Godzik et al. | ................ | 707/783 |
| 2007/0022098 A1 * | 1/2007 | Malik | ............................... | 707/3 |
| 2009/0013044 A1 * | 1/2009 | Stull | ............................. | 709/205 |
| 2011/0113118 A1 | 5/2011 | Matsuda et al. | | |
| 2011/0134248 A1 * | 6/2011 | Heit et al. | ..................... | 348/161 |

FOREIGN PATENT DOCUMENTS

| | | |
|---|---|---|
| JP | 11-175639 | 7/1999 |
| JP | 2001-109786 | 4/2001 |
| JP | 2004-070466 | 3/2004 |
| JP | 2008-250780 | 10/2008 |

* cited by examiner

*Primary Examiner* — Kambiz Zand
*Assistant Examiner* — Tongoc Tran
(74) *Attorney, Agent, or Firm* — Harness, Dickey & Pierce, P.L.C.

(57) ABSTRACT

A content processing system includes a content management device storing contents and information associated with the contents, and a plurality of portable terminals capable of accessing the content management device through a network, and performs a process on the contents according to a workflow using the plurality of portable terminals. The content processing system may include a first executing unit that let at least a part of the contents and the associated information be stored in a portable terminal among the plurality of portable terminals to perform a second process when the process to be currently performed in the workflow is moved from a first process to the second process.

9 Claims, 10 Drawing Sheets

CONTENT PROCESSING SYSTEM, CONTENT PROCESSING METHOD, COMPUTER PROGRAM, RECORDING MEDIUM, AND PORTABLE TERMINAL

BACKGROUND

1. Technical Field

The present invention relates to a content processing system, a content processing method, a computer program, a recording medium, and a portable terminal.

2. Related Art

As a content processing system, a workflow system for performing a process on contents according to a workflow is known (for example, see, JP-A-2008-250780, JPA-2004-70466, 2001-109786, and JP-A-11-175639). In the workflow system, a user to perform a process may access a content management device where contents are stored, using a terminal such as a personal computer (PC), or the like, and perform a process on the contents.

For example, in JP-A-2008-250780, there is disclosed a workflow system that may distribute, to a terminal, position information of a document corresponding to the processing during a business process. For example, in Japanese Unexamined Patent Application Publication No. 2004-70466, there is disclosed a technique that may reduce the laboriousness of creating documents and errors in contract business and accepting and ordering programs in the workflow system. For example, in Japanese Unexamined Patent Application Publication No. 2001-109786, there is disclosed a technique that may compare, in the workflow system, the edition number of a design document being sent with the edition number of a delivered design document, and indicate the locations of changes to the designer when the edition numbers of both design documents differ, while delivering a design document to the terminal of each of the designers. For example, in JP-A-11-175639, there is disclosed a technique that may automatically prepare, in the workflow system, a flow related to a new work by transmitting the results from the terminal of each responsible party to the terminal of the next responsible party judged by the person himself and by monitoring the transmission.

However, in the above described workflow system, when a user performs a process on the contents in the terminal, a technical problem arises in that it requires a significant amount of time and effort (that is, time and labor) for downloading the contents from a content management device to the terminal, so that it is difficult to effectively perform the content process. Also, a technical problem arises in that it requires a significant amount of time and effort to store, in the content management device, processed contents by the user in the terminal.

SUMMARY

An advantage of some aspects of the invention is to provide a content processing system, a content processing method, a computer program, a recording medium, and a portable terminal capable of effectively performing a process on contents according to a workflow.

According to an aspect of the present invention, there is provided a content processing system that includes a content management device storing contents and information associated with the contents, and a plurality of portable terminals capable of accessing the content management device through a network, and performs a process on the contents according to a workflow using the plurality of portable terminals. Here, the content processing system may include a first executing unit that let at least a part of the contents and the associated information be stored in a portable terminal among the plurality of portable terminals to perform a second process when the process to be currently performed in the workflow is moved from a first process to the second process.

According to the content processing system according to the aspect of the invention, the process may be performed on the contents stored in the content management device according to the workflow, using the portable terminal such as a Personal Digital Assistant (PDA), a mobile phone, a portable computer, and the like by a plurality of users. Here, the "contents" according to the aspect of the invention may denote document data, picture data, music data, video data, or some combination thereof. As an example of the contents, Portable Document Format (PDF) data is given. The "information associated with the contents" according to the aspect of the invention is information which corresponds to the contents, and denotes information related to the contents. As the information associated with the contents, for example, information indicating changes in the contents due to the performed process, or other contents related to the contents (for example, other contents which can be used as reference when performing the process on the contents by the user) are used. A plurality of portable terminals is provided to respectively correspond to at least one of a plurality of users. The workflow defines a flow of a plurality of processes to be performed on the contents and a user to perform each of the plurality of processes. The workflow is managed by, for example, a workflow management device connected to the content management device through a network. For example, whether any process of the plurality of processes defined in the workflow is performed (that is, the corresponding process is completed), whether a process to be currently performed is any process of the plurality of processes, whether the user to perform the process is any user of the plurality of users, and whether the portable terminal corresponding to the user is any portable terminal of the plurality of portable terminals, and the like are managed by the workflow management device. Further, the workflow may be managed by other devices connected to the content management device through a network, and may be managed by, for example, a fixed terminal such as a PC, or the like.

In this configuration, particularly, the first executing unit may let the at least a part of the contents and the associated information be stored in a portable terminal among the plurality of portable terminals to perform the second process when the process to be currently performed in the workflow is moved from the first process to the second process.

Thus, it is possible to reduce time and effort of the user required for storing the contents and the associated information from the content management device to the portable terminal when a user performs the second process using the portable terminal. That is, it is possible to reduce time and effort required when the user performs the second process using the portable terminal, in comparison with a case in which the user accesses the content management device using the portable terminal, searches contents in which the second process is to be performed and information associated with the contents (for example, other contents related to the contents), and downloads the searched information from the content management device to the portable terminal, when performing the second process using the portable terminal.

Accordingly, the content processing system according to the aspect of the invention may effectively perform the process on the contents according to the workflow.

In the configuration, the content processing system according to the aspect of the invention may further include a second executing unit that let at least a part of the processed contents and the associated information be stored in the content management device when the process is performed on the contents using the portable terminal.

According to configuration, it is possible to reduce or eliminate the laboriousness in storing the processed contents and the associated information in the content management device by the user, and also possible to reduce time after the process is performed on the contents before the processed contents and the associated information are stored in the content management device.

In the configuration, when the process is performed on the contents by the portable terminal, the second executing unit may let post-processing information be stored in the content management device as the associated information. The post-processing information indicate change in the contents due to the performed process.

Due to this configuration, it is possible to reduce or eliminate the laboriousness of storing the post-processing information of the contents in the content management device by the user, and also possible to reduce time after the process is performed on the contents before the post-processing information of the contents is stored in the content management device.

In the configuration, the content processing system according to the aspect of the invention may further include an erasing unit that erases, from the portable terminal, the processed contents and the associated information stored in the portable terminal, when the at least a part of the processed contents and the associated information is stored in the content management device by the second executing unit.

In this case, it is possible to reduce or eliminate laboriousness of managing the processed contents and the associated information using the portable terminal by the user. In addition, it is possible to avoid pressure on the storage capacity of the storage unit, such as a memory, a hard disk, or the like of the portable terminal, from the post-processing information.

In the configuration, the content processing system according to the aspect of the invention may further include a fixed terminal that is provided to correspond to at least one of the plurality of portable terminals and functions as at least a part of the first executing unit, the second executing unit, and the erasing unit.

In this case, since the fixed terminal such as a desktop PC, or the like functions as at least a part of the first executing unit, the second executing unit, and the erasing unit, the portable terminal may not function as the mentioned at least a part, and have a relatively simple configuration.

In the configuration, each of the plurality of portable terminals may have an adding unit that adds at least one of a handwritten character, a highlighted display, and an electronic tag to the contents as associated information.

Due to this configuration, the user may readily add the associated information related to the process to the contents. Therefore, it is possible to increase the convenience when the user performs the process on the contents.

In the configuration, each of the plurality of portable terminals may have a display unit that is formed of an electronic paper for displaying the contents.

Due to this configuration, the user may perform the process on the contents using a portable terminal with a feeling of a paper or the like.

Each of the plurality of portable terminals may have at least one of a function of encrypting information, a function of decrypting information, a function of performing device authentication, a function of performing biometric authentication, and a function of performing password authentication.

Due to this configuration, it is possible to reduce the risk to information security such as leakage or falsification of the contents.

According to another aspect of the present invention, there is provided a content processing method for performing a process on contents according to a workflow using a plurality of portable terminals. Here, the content processing method may include storing at least a part of the contents and the associated information of the contents in a portable terminal among the plurality of portable terminals to perform a second process when the process to be currently performed in the workflow is moved from a first process to the second process.

In the content processing method according to the aspect of the invention, it is possible to effectively perform the process on the contents according to the workflow, in the same manner as that of the above described content processing system of the invention.

In addition, in response to various aspects of the content processing system of the invention, the content processing method of the invention may also have various aspects.

According to still another aspect of the present invention, there is provided a computer program that controls a computer included in the above described content processing system. Here, the computer program may enable the computer to function as the first executing unit.

In the computer program according to this aspect of the invention, it is possible to effectively perform the process on the contents according to the workflow in the same manner as that of the above described content processing system.

In addition, in response to various aspects of the content processing system of the invention, the computer program of the invention may also have various aspects.

According to still another aspect of the present invention, there is provided a recording medium in which the above described computer program is recorded to read by a computer.

For the recording medium according to the aspect of the invention, it is possible to effectively perform the process on the contents according to the workflow in the same manner as that of the above described content processing system.

In addition, in response to various aspects of the content processing system, the recording medium of the invention may also have various aspects.

According to still another aspect of the present invention, there is provided a portable terminal that is connected, through a network, to a content management device for storing contents on which a process is performed according to a workflow and information associated with the contents. Here, the portable terminal may include a executing unit that let at least a part of the contents and the associated information be stored in a corresponding portable terminal in a case where a second process is a process to be performed by the corresponding portable terminal when a process to be currently performed in the workflow is moved from a first process to the second process.

In the portable terminal according to the aspect of the invention, it is possible to effectively perform the process on the contents according to the workflow in the same manner as that of the above described content processing system.

In addition, in response to various aspects of the content processing system, the portable terminal of the invention may also have various aspects.

Other aspects of the invention will be described with reference to the following embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the present invention will be described in detail with reference to drawings.

First Embodiment

A content processing system according to a first embodiment will be described with reference to FIGS. 1 to 7.

First, a configuration of the content processing system according to the embodiment will be described with reference to FIGS. 1 and 2.

Figure 1:
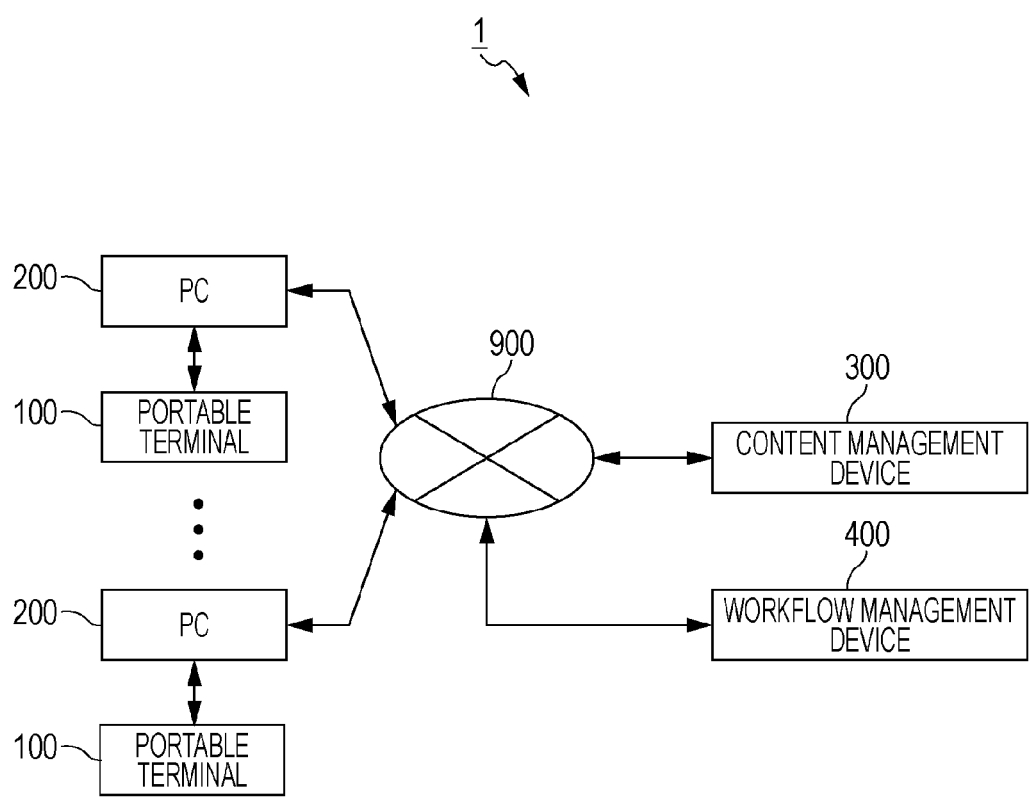
FIG. 1 is a block diagram showing a schematic configuration of a content processing system according to a first embodiment of the invention.

FIG. 1 is a block diagram showing a schematic configuration of a content processing system according to a first embodiment of the invention.

Referring to FIG. 1, the content processing system 1 according to the embodiment is a system for performing a process on contents, stored in a content management device 300, according to a workflow using a portable terminal 100 by a plurality of users.

The content processing system 1 includes a plurality of portable terminals 100, a plurality of personal computers (PC) 200, the content management device 300, and a workflow management device 400. The plurality of PCs 200, the content management device 300, and the workflow management device 400 are connected to each other through a network 900 such as the Internet, a Local Area Network (LAN), and the like. Each of the plurality of portable terminals 100 is provided to correspond to any of the plurality of PCs 200, and is configured to be connectable to a corresponding PC 200 by wireless or wired communication.

The content management device 300 has a document management system (DMS), and stores or manages a plurality of contents and information associated with the contents. Here, contents denote document data, picture data, music data, video data, or some combination thereof. As an example of the contents, PDF data may be given. Also, the associated information is information which corresponds and is associated with the contents, and denotes information related to the contents. As the information associated with the contents, for example, post-processing information indicating changes in the contents due to the performed process, or related contents related to the contents (for example, contents which can be used as reference when performing the process on the contents by the user) are used.

The workflow management device 400 manages a workflow defining a flow of a plurality of processes to be performed on contents stored in the content management device 300. The workflow management device 400 manages whether any process of the plurality of processes defined in the workflow is performed (that is, whether any of the processes has been performed), whether a process to be currently performed is any process of the plurality of processes, whether the user to perform the process is any user of the plurality of users, and whether the portable terminal 100 corresponding to the user is any portable terminal 100 of the plurality of portable terminals 100, and the like are managed by the workflow management device. More specifically, the workflow management device 400 manages the processing state of the process to be performed by each user in the workflow as any one of "unprocessed", "in progress", and "processing complete". That is, the workflow management device 400 manages a processing state in which a process has not yet been performed as "unprocessed", a processing state in which a process is currently being performed by the user as "in progress", and a processing state in which a process has already been performed as "processing complete". In addition, the workflow management device 400 manages a storage location in the content management device 300 where contents on which a process is to be performed and the related contents are stored, with respect to each of the plurality of processes in the workflow.

The PC 200 is a desktop PC as an example of a "fixed terminal" according to the embodiment of the invention. The PC 200 acquires contents and related contents from the content management device 300, and transmits the acquired contents to the portable terminal 100. In addition, a configuration of the PC 200 will be described in detail later with reference to FIG. 2.

The portable terminal 100 is made from an information processing device such as a PDA capable of being carried by the user, a mobile phone, a portable computer, or the like, and is used for performing a process on contents by a user. The portable terminal 100 is configured to be capable of displaying or editing the contents. In addition, a configuration of the portable terminal 100 will be described in detail later with reference to FIG. 2.

Figure 2:
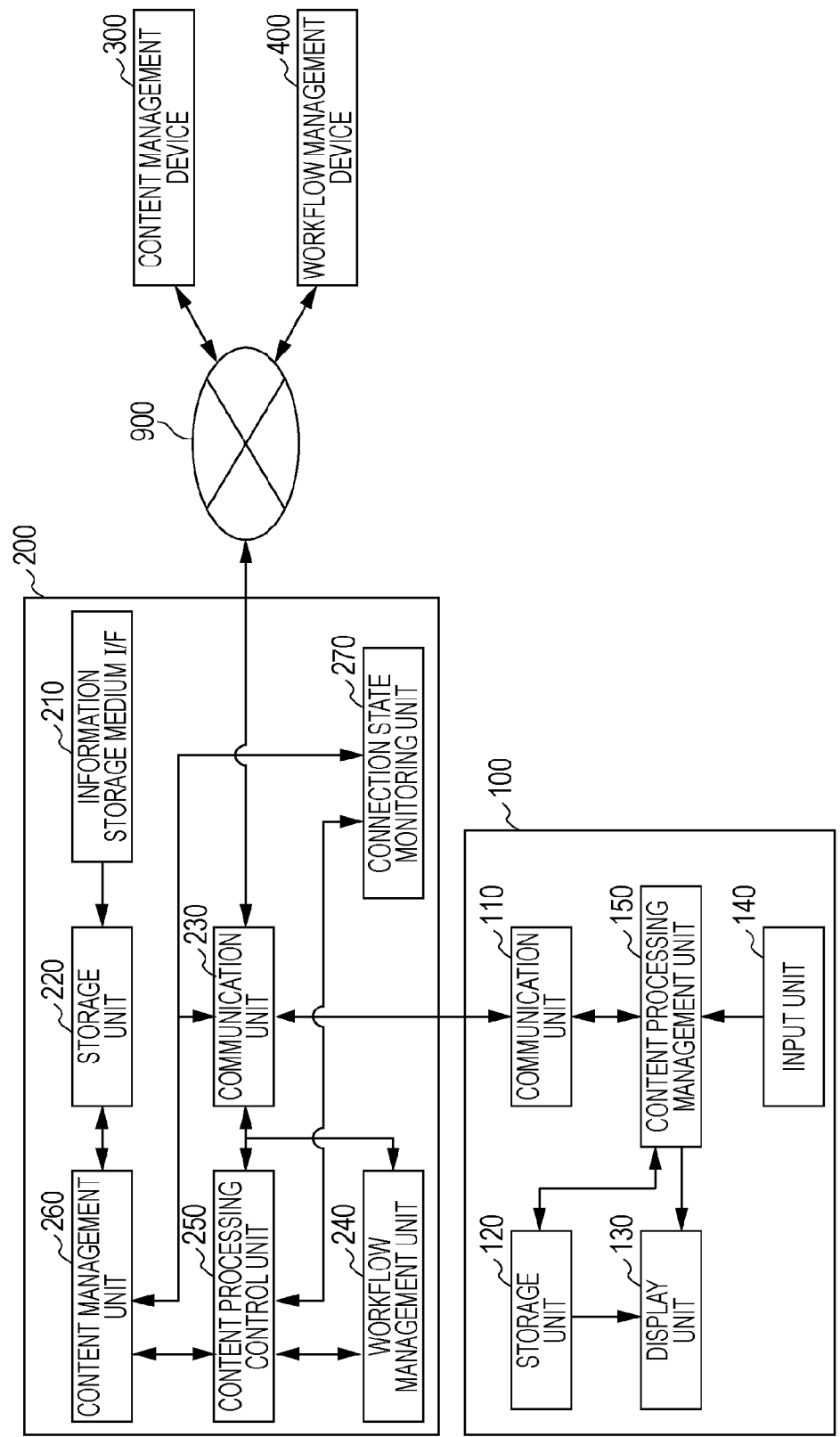
FIG. 2 is a block diagram showing a configuration of a personal computer (PC) and a portable terminal according to a first embodiment of the invention.

FIG. 2 is a block diagram showing a configuration of a PC 200 and a portable terminal 100 according to a first embodiment of the invention.

Referring to FIG. 2, the PC 200 includes an information recording medium interface (I/F: interface) 210, a storage unit 220, a communication unit 230, a workflow management unit 240, a content processing control unit 250, a content management unit 260, and a connection state monitoring unit 270.

The information recording medium interface (I/F) 210 is made from, for example, an optical disc drive, and reads information recorded on the recording medium such as an optical disc, or the like.

The storage unit 220 is made from, for example, a hard disk, a flash memory, or the like, and temporarily preserves or stores contents.

The communication unit 230 has, for example, a LAN interface, and performs communication with the portable terminal 100, the content management device 300, and the workflow management device 400.

The workflow management unit 240 is made from, for example, a central processing unit (CPU), a random access memory (RAM), a read only memory (ROM), or the like, and manages a workflow in which a process is performed by the portable terminal 100 corresponding to the PC 200. For example, the workflow management unit 240 manages a processing state to be performed by the portable terminal 100 corresponding to the PC 200 in the workflow, and obtains, from the workflow management device 400, information (for example, names of the contents and the related contents or storage location in the content management device 300) associated with the contents and the related contents for which the process is to be performed, or storage destination information indicating a storage location in which the processed contents and the related contents are stored. In addition, the workflow management unit 240 transmits the obtained information to the content processing control unit 250.

The content processing control unit 250 is made from, for example, a CPU, RAM, ROM, or the like, and comprehensively controls a process performed on the contents by the portable terminal 100 corresponding to the PC 200. For example, the content processing control unit 250 controls the content management unit 260, which will be described later, so as to transmit, to the portable terminal 100, the contents on which a process is to be performed, and transmits, to the content processing management unit 150 of the portable terminal 100, information indicating whether the contents and the related contents which are transmitted to the portable terminal 100 by the content management unit 260 are to be performed by any user of a plurality of users. In addition, the content processing control unit 250 updates a processing state of the process to be performed by the portable terminal 100 corresponding to the PC 200 managed by the workflow management unit 240.

The content management unit 260 is made from, for example, a CPU, an RAM, an ROM, or the like, and obtains, from the content management device 300, contents and the related contents to thereby temporarily preserve or store the obtained contents in the storage unit 220. Also, the content management unit 260 transmits, to the portable terminal 100 through the communication unit 230, the contents and the related contents temporarily preserved or stored in the storage unit 220.

The connection state monitoring unit 270 monitors a connection state between the PC 200 and the portable terminal 100. That is, the connection state monitoring unit 270 monitors whether or not a communication unit 230 of the PC 200 and a communication unit 110 of the portable terminal 100 are in a connection state capable of communicating.

Referring to FIG. 2, the portable terminal 100 includes the communication unit 110, a storage unit 120, a display unit 130, and an input unit 140, and a content processing management unit 150.

The communication unit 110 has a communication interface, and performs communication with the communication unit 230 of the PC 200.

The storage unit 120 is made from, for example, a hard disk, a flash memory, or the like, and temporarily preserves or stores contents.

The display unit 130 is made from an electronic paper, and displays contents preserved in the storage unit 120. In addition, the display unit 130 displays associated information of contents or a message prompting processing of the contents. Here, according to the present embodiment, particularly, since the display unit 130 is made from the electronic paper, it is possible for the user to perform a process on contents using the portable terminal 100 with a feeling of a paper or the like. In addition, the display unit 130 may be configured from a liquid crystal display or an organic electroluminescence display.

The input unit 140 is made from, for example, a touch panel, a button, or the like, and is configured such that an instruction for performing a process on contents by a user can be input. The input unit 140 is configured such that handwritten characters, a highlighted display, and an electronic tag are added to the contents. Consequently, it is possible for the user to easily add associated information associated with the processing of the contents to the contents. Thus, it is possible to increase convenience when the process is performed on the contents by the user. In addition, the input unit 140 is an example of an "adding unit" of the invention.

The content processing management unit 150 is made from, for example, a CPU, a RAM, a ROM, or the like, and manages the processing of the contents in the portable terminal 100. For example, the content processing management unit 150 displays, in the display unit 130, the message prompting the processing of the contents or the contents for which the process is to be performed and the related contents, or manages a processing state of the performed process in the portable terminal 100. More specifically, the content processing management unit 150 manages the processing state of the process performed by the portable terminal 100 as any one of "unprocessed", "in progress", and "processing complete". That is, the content processing management unit 150 manages a processing state in which a process has not yet been performed as "unprocessed", a processing state in which a process is currently being performed by the user as "in progress", and a processing state in which a process has already been performed as "processing complete". In addition, the content processing management unit 150 preserves or stores, in the storage unit 120, the contents and the related contents received from the PC 200, or transmits, to the PC 200, the processed contents and the related contents.

In addition, the portable terminal 100 may have at least one of a function of encrypting information, a function of decrypting information, a function of performing device authentication, a function of performing biometric authentication, and a function of performing password authentication. In this case, it is possible to reduce the risk to information security such as leakage or falsification of the contents.

Next, operations of the content processing system according to the embodiment of the invention will be described with reference to FIGS. 3 to 7 in addition to FIG. 2.

Figure 3:
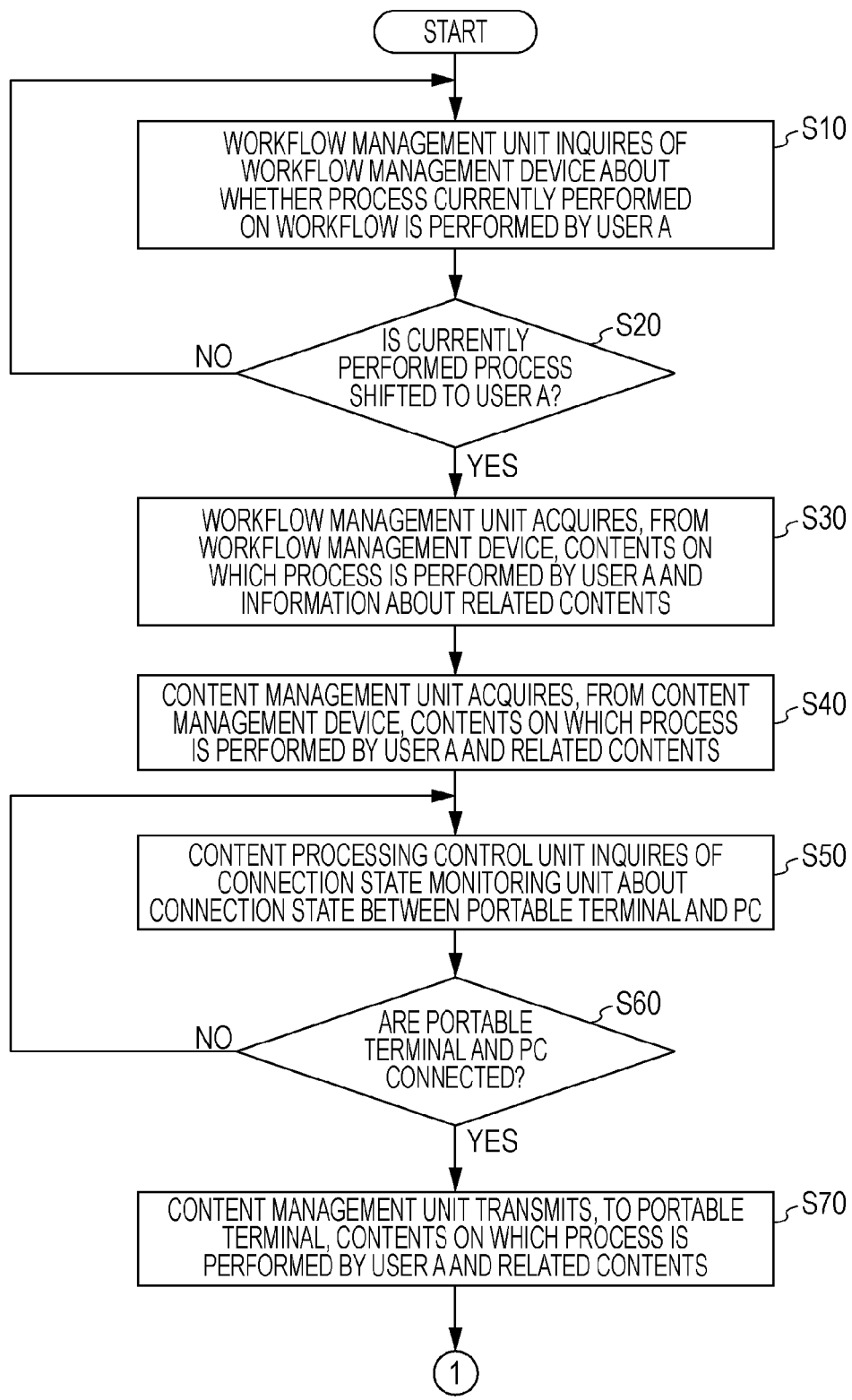
FIG. 3 is a first flowchart for describing a first operation example of a content processing system according to a first embodiment of the invention.
Figure 4:
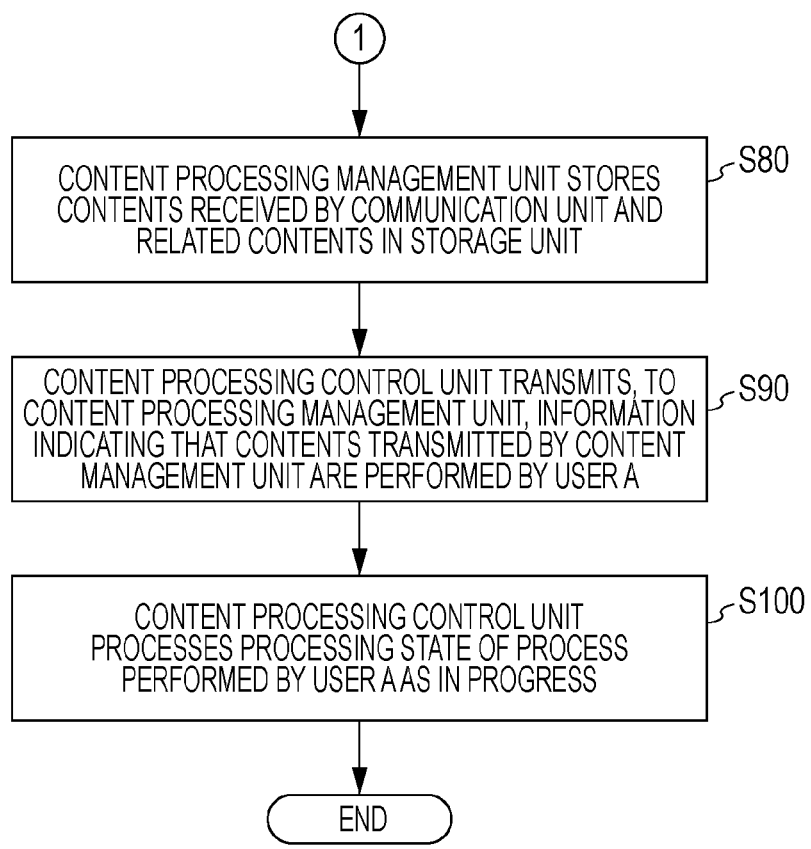
FIG. 4 is a second flowchart for describing a first operation example of a content processing system according to a first embodiment of the invention.

FIGS. 3 and 4 are flowcharts for describing a first operation example of a content processing system 1 according to a first embodiment of the invention.

Referring to FIGS. 3 and 4, as the first operation example of the content processing system 1, operations when a process to be currently performed in a workflow managed by the workflow management device 400 is moved to a user A of a plurality of users are shown. In addition, hereinafter, the portable terminal 100 and the PC 200 are provided to correspond to the user A.

Referring to FIG. 3, first, the workflow management unit 240 of the PC 200 inquires of the workflow management device 400 through the communication unit 230 and a network 900 about whether the process to be currently performed in the workflow is a process to be performed by the user A (Step S10). Next, the workflow management unit 240 determines whether the process to be currently performed in the workflow is moved to the user A based on the response from the workflow management device 400 (Step S20).

When the process to be currently performed in the workflow is determined not to be moved to the user A, that is, when the process to be currently performed is a process to be performed by users other than the user A of the plurality of users (Step S20: No), the workflow management unit 240 repeatedly inquires of the workflow management device 400 as to whether the process to be currently performed in the workflow is the process to be performed by the user A after a predetermined period of time (Step S10).

When the process to be currently performed in the workflow is determined to be moved to the user A, that is, when the process to be currently performed is the process to be performed by the user A (Step S20: Yes), the workflow management unit 240 acquires, from the workflow management device 400, information (for example, names of the contents and the related contents, or storage location in the content management device 300) associated with contents to be performed by the user A and the related contents (Step S30). In this instance, the workflow management unit 240 transmits, to the content management unit 260, "the information associated with the contents on which processing is to be performed by the user A and the related contents", and at the same time, transmits, to the content processing control unit 250, information indicating that the process to be currently performed in the workflow is moved to the user A and the "the information associated with the contents on which processing is to be performed by the user A and the related contents". Also, the workflow management unit 240 gives, to the content management unit 260, an instruction indicating the contents on which processing is to be performed by the user A and the related contents are acquired from the content management device 300.

Next, the content management unit 260 acquires, from the content management device 300 through the communication unit 230 and the network 900, the contents on which processing is to be performed by the user A and the related contents based on "the information associated with the contents on which processing is to be performed by the user A and the related contents" transmitted from the workflow management unit 240 (Step S40). In this instance, the content management unit 260 temporarily preserves or stores, in the storage unit 220, the acquired contents and the related contents.

Next, the content processing control unit 250 inquires of the connection state monitoring unit 270 about the connection state between the portable terminal 100 and the PC 200 (Step S50). Next, the connection state monitoring unit 270 determines whether the portable terminal 100 and the PC 200 are connected to each other, that is, whether or not the communication unit 230 of the PC 200 is in the connection state capable of communicating with the communication unit 110 of the portable terminal 100 (Step S60).

When the portable terminal 100 and the PC 200 are determined to not be connected to each other (Step S60: No), the content processing control unit 250 repeatedly inquires of the connection state monitoring unit 270 about the connection state between the portable terminal 100 and the PC 200 after a predetermined period of time (Step S50).

When the portable terminal 100 and the PC 200 are determined to be connected to each other (Step S60: Yes), the content processing control unit 250 controls the content management unit 260, so that the contents on which processing is to be performed by the user A and the related contents are transmitted to the portable terminal 100 (Step S70). In other words, in this case (Step S60: Yes), the content management unit 260 transmits, to the portable terminal 100 through the communication unit 230, the contents on which processing is to be performed by the user A and the related contents which are temporarily preserved in the storage unit 220, under the control by the content processing control unit 250 (Step S70).

Next, referring to FIG. 4, the content processing management unit 150 of the portable terminal 100 preserves or stores, in the storage unit 120, the contents on which processing is to be performed by the user A and the related contents which are received by the communication unit 110 (Step S80).

Next, the content processing control unit 250 of the PC 200 transmits, to the content processing management unit 150 of the portable terminal 100, information indicating the contents transmitted by the content management unit 260 is to be performed by the user A (Step S90).

Next, the content processing management unit 150 of the portable terminal 100 processes the processing state of the process to be performed by the user A as "in progress" (Step S100).

Thereafter, the user A cuts the connection between the PC 200 and the portable terminal 100, and carries the portable terminal 100 to perform the process of the contents by the portable terminal 100.

Here, according to the embodiment of the invention, particularly, when the process to be currently performed in the workflow is moved to the user A (Step S20: Yes), the contents on which processing is to be performed by the user A and the related contents are stored in the portable terminal 100 corresponding to the user A (Steps S30 to S80). In addition, the workflow management unit 240 of the PC 200, the content processing management unit 250, and the content management unit 260 configure an example of the "first executing unit" of the invention.

Thus, it is possible to reduce time and effort of the user A required for storing, from the content management device 300 to the portable terminal 100, the contents and the related contents when the user A performs the process by the portable terminal 100. That is, when performing the process by the portable terminal 100 by the user A, it is possible to reduce time and effort required when performing the process using the portable terminal 100 by the user A, in comparison with a case of downloading the searched contents from the content management device 300 to the portable terminal 100, by accessing the content management device 300 using the portable terminal 100 by the user A and by searching the contents for which the process is to be performed and the related contents.

Thus, in the content processing system 1 according to the embodiment of the invention, it is possible to effectively perform the process on the contents according to the workflow.

Figure 5:
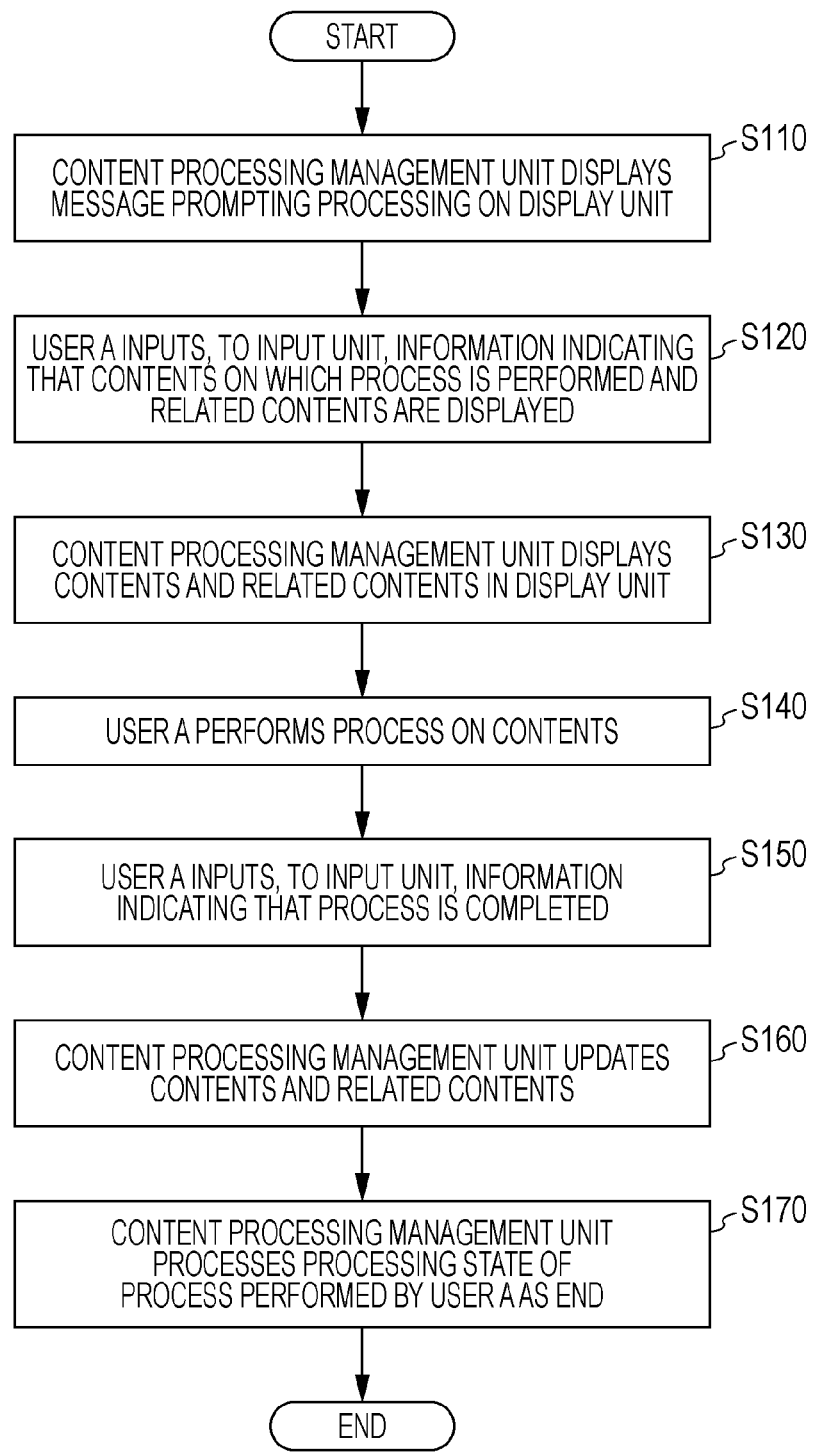
FIG. 5 is a flowchart for describing a second operation example of a content processing system according to a first embodiment of the invention.

FIG. 5 is a flowchart for describing a second operation example of the content processing system 1 according to a first embodiment of the invention.

Referring to FIG. 5, as the second operation examples of the content processing system 1, operations when the process to be currently performed in the workflow is moved to the user A, and the user A performs the process using the portable terminal 100 are shown.

Referring to FIG. 5, the content processing management unit 150 of the portable terminal 100 displays a message prompting processing of the contents in the display unit 130 (Step S110).

Next, the user A inputs, in the input unit 140, an instruction indicating the contents for which the process is to be performed and the related contents to be displayed in the display unit 130 (Step S120).

Next, the content processing management unit 150 displays, in the display unit 130, the contents in which the process is to be performed by the user A and the related contents which are preserved in the storage unit 120, in response to the instruction input to the input unit 140 in Step S120 (Step S130).

Next, the user A browses the related contents displayed, for example, in the display unit 130, and performs a process such as adding handwritten characters, the highlighted display, or the electronic tag to the contents (Step S140). In this instance, the process is performed on the contents by the user A, so that information associated with the contents is changed.

Next, the user A inputs information indicating that the process is completed in the input unit 140 (Step S150).

Next, the content processing management unit 150 updates the contents and the related contents preserved in the storage unit 120 to contents after the process is performed by the user A and the related contents (Step S160). That is, the content processing management unit 150 overwrites the contents after the process is performed by the user A and the related contents on the contents and the related contents preserved in the storage unit 120.

Next, the content processing management unit 150 processes a processing state of the process to be performed by the user A as "processing complete" (Step S170).

Figure 6:
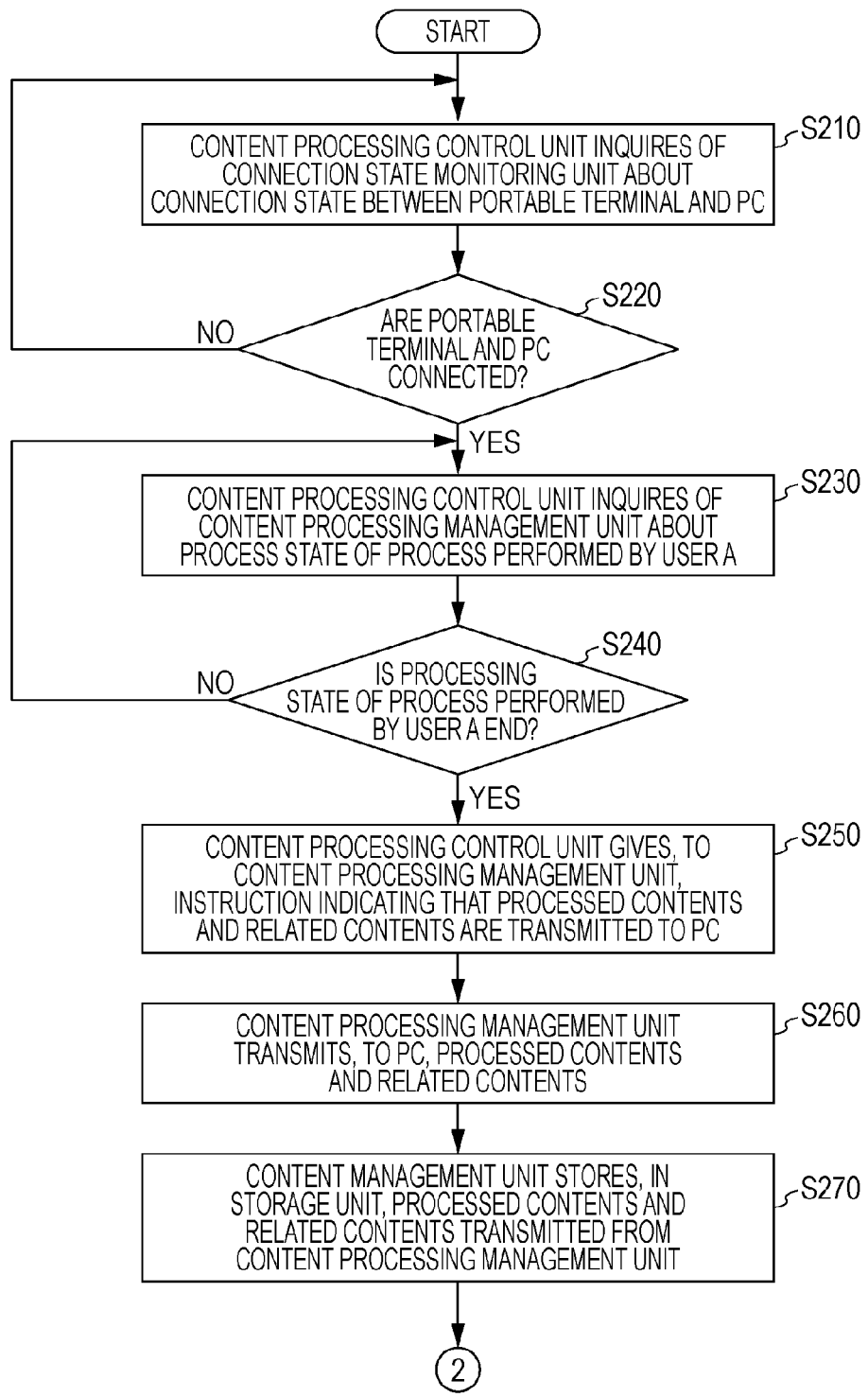
FIG. 6 is a first flowchart for describing a third operation example of a content processing system according to a first embodiment of the invention.
Figure 7:
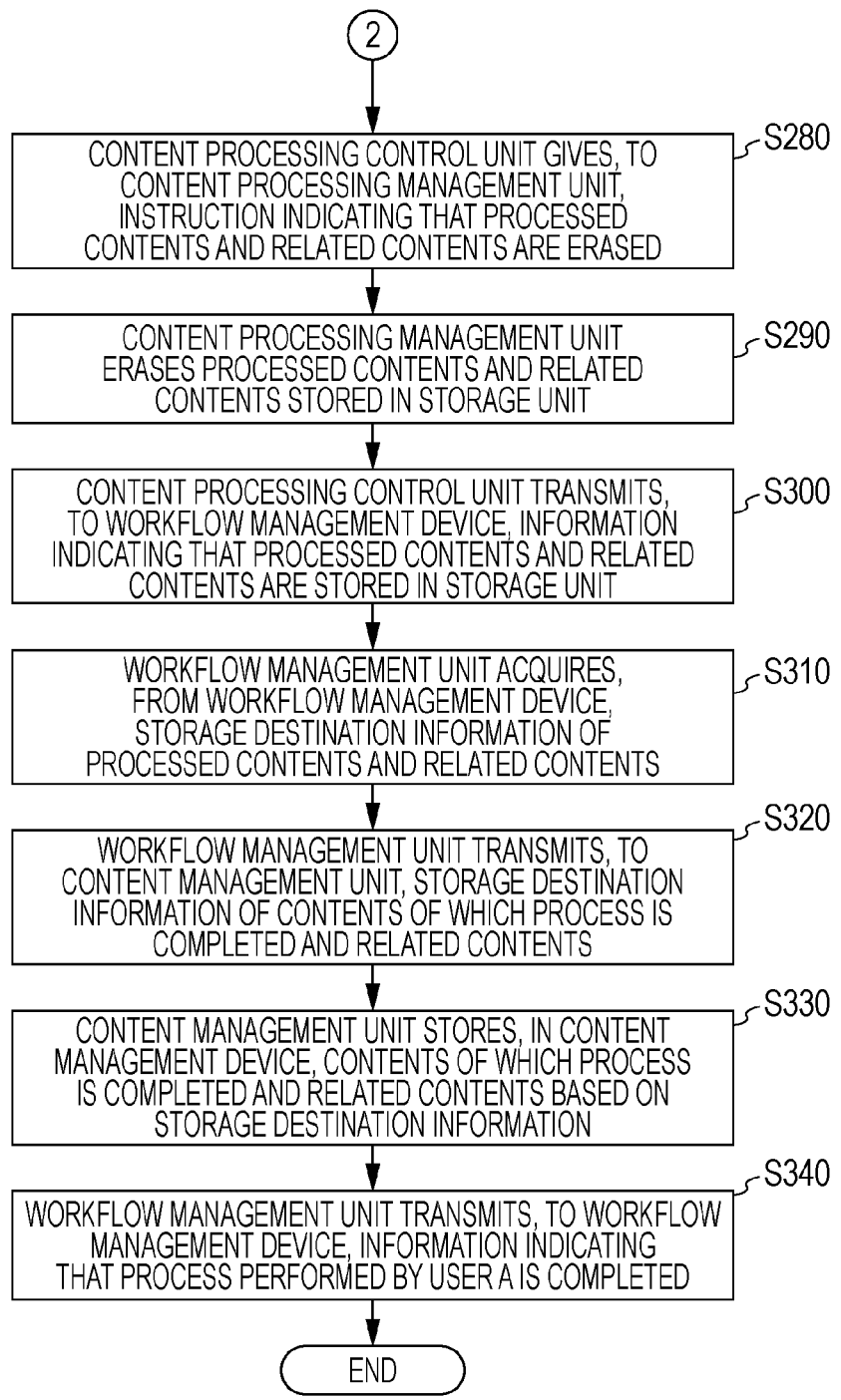
FIG. 7 is a second flowchart for describing a third operation example of a content processing system according to a first embodiment of the invention.

FIGS. 6 and 7 are flowcharts for describing a third operation example of the content processing system 1 according to a first embodiment of the invention.

Referring to FIGS. 6 and 7, as the third operation example of the content processing system 1, operations after a process to be currently performed in a workflow is moved to a user A, and the user A performs a process using the portable terminal 100 are shown.

Referring to FIG. 6, first, the content processing control unit 250 of the PC 200 inquires of the connection state monitoring unit 270 about the connection state between the portable terminal 100 and the PC 200 (Step S210). Next, the connection state monitoring unit 270 determines whether the portable terminal 100 and the PC 200 are connected to each other (Step S220).

When the portable terminal 100 and the PC 200 are determined not to be connected to each other (Step S220: No), the content processing control unit 250 repeatedly inquires of the connection state monitoring unit 270 about the connection state between the portable terminal 100 and the PC 200 after a predetermined period of time (Step S210).

When the portable terminal 100 and the PC 200 are determined to be connected to each other (Step S220: Yes), the content processing control unit 250 inquires of the content processing management unit 150 of the portable terminal 100 about a processing state of the process to be performed by the user A (Step S230). Next, the content processing control unit 250 determines whether the processing state of the process to be performed by the user A is "processing complete" based on the response from the content processing management unit 150 (Step S240).

When the processing state of the process to be performed by the user A is determined not to be "processing complete", that is, when the processing state is determined to be "in progress" or "unprocessed" (Step S240: No), the content processing control unit 250 inquires of the content processing management unit 150 about the processing state of the process to be performed by the user A after a predetermined period of time (Step S230).

When the processing state of the process to be performed by the user A is determined to be "processing complete" (Step S240: Yes), the content processing control unit 250 gives, to the content processing management unit 150 through the communication unit 110 and the communication unit 230, an instruction that information indicating the processed contents and the related contents are to be transmitted to the PC 200 (Step S250).

Next, the content processing management unit 150 transmits, to the PC 200, the processed contents and the related contents preserved in the storage unit 120, in response to the instruction given from the content processing control unit 250 in Step S250 (Step S260).

Next, the content management unit 260 of the PC 200 temporarily preserves or stores, in the storage unit 220, the processed contents and the related contents transmitted from the content processing management unit 150 in Step S260 (Step S270).

Next, as shown in FIG. 7, the content processing control unit 250 gives, to the content processing management unit 150 through the communication unit 230 and the communication unit 110, an instruction indicating that the processed contents and the related contents preserved in storage unit 120 are to be erased (Step S280).

Next, the content processing management unit 150 erases the processed contents and the related contents preserved in the storage unit 120, in response to the instruction given from the content processing control unit 250 in Step S280 (Step S290).

Next, the content processing control unit 250 transmits, to the workflow management unit 240, information indicating that the processed contents and the related contents are preserved or stored in the storage unit 220 in Step S270 (Step S300).

Next, the workflow management unit 240 acquires, from the workflow management device 400, storage destination information of the processed contents and the related contents (that is, information indicating a storage location in the content management device 300 where the processed contents and the related contents are stored).

Next, the workflow management unit 240 transmits, to the content management unit 260, the storage destination information of the processed contents and the related contents (Step S320). In this instance, the workflow management unit 240 gives, to the content management unit 260, an instruction indicating that the processed contents and the related contents are to be stored in the content management device 300.

Next, the content management unit 260 stores, in the content management device 300, the processed contents and the related contents preserved in the storage unit 220 according to the storage destination information, in response to the instruction given from the workflow management unit 240 in Step S320 (Step S330).

Next, the workflow management unit 240 transmits, to the workflow management device 400, information indicating that the process to be performed by the user A is completed (Step S340). In response to this, the workflow management device 400 shifts the process to be currently performed in the workflow to the next process, that is, moves the user to currently perform the process on the contents in the workflow from the user A to the next user.

Here, according to the embodiment, particularly, when the process to be performed by the user A is completed (Step S240: Yes), the processed contents for which the process is performed by the user A and the related contents are stored in the content management device 300 by the content management unit 260 of the PC 200 (Step S330). Due to this, it is possible to reduce or eliminate laboriousness of storing, in the content management device 300, the processed contents and the related contents after performing the process on the contents by the user A. In addition, it is possible to reduce a time after the process is performed on the contents before the processed contents and the related contents are stored in the content management device 300. In addition, the content processing control unit 250 and the content management unit 260 of the PC 200 configure an example of the "second executing unit" of the invention.

In addition, according to the embodiment of the invention, particularly, after the processed contents and the related contents are temporarily preserved or stored in the storage unit 220 by the content management unit 260 (Step S270), the content processing management unit 150 erases the processed contents and the related contents preserved in the storage unit 120, in response to the instruction from the content processing control unit 250 (Step S290). Thus, it is possible to reduce or eliminate laboriousness of managing the processed contents and the related contents using the portable terminal 100 by the user A. In addition, it is possible to avoid pressure on the storage capacity of the storage unit 120 of the portable terminal 100 by the processed contents and the related contents. In addition, the content processing control unit 250 and the content management unit 260 of the PC 200 configure an example of the "erasing unit" of the invention.

As described above, in the content processing system 1 according to the embodiment of the invention, it is possible to reduce time and effort of the user required for storing the contents and the related contents from the content management device 300 to the portable terminal 100 when the process is performed by the user using the portable terminal 100. Thus, it is possible to effectively perform the process on the contents according to the workflow.

Second Embodiment

The content processing system according to a second embodiment will be described with reference to FIGS. 8 to 10.

First, a configuration of the content processing system according to the second embodiment will be described with reference to FIG. 8. In addition, in FIG. 8, the same numeral references are given to the same components as those associated with the first embodiment shown in FIGS. 1 and 2, and descriptions thereof will be omitted.

Figure 8:
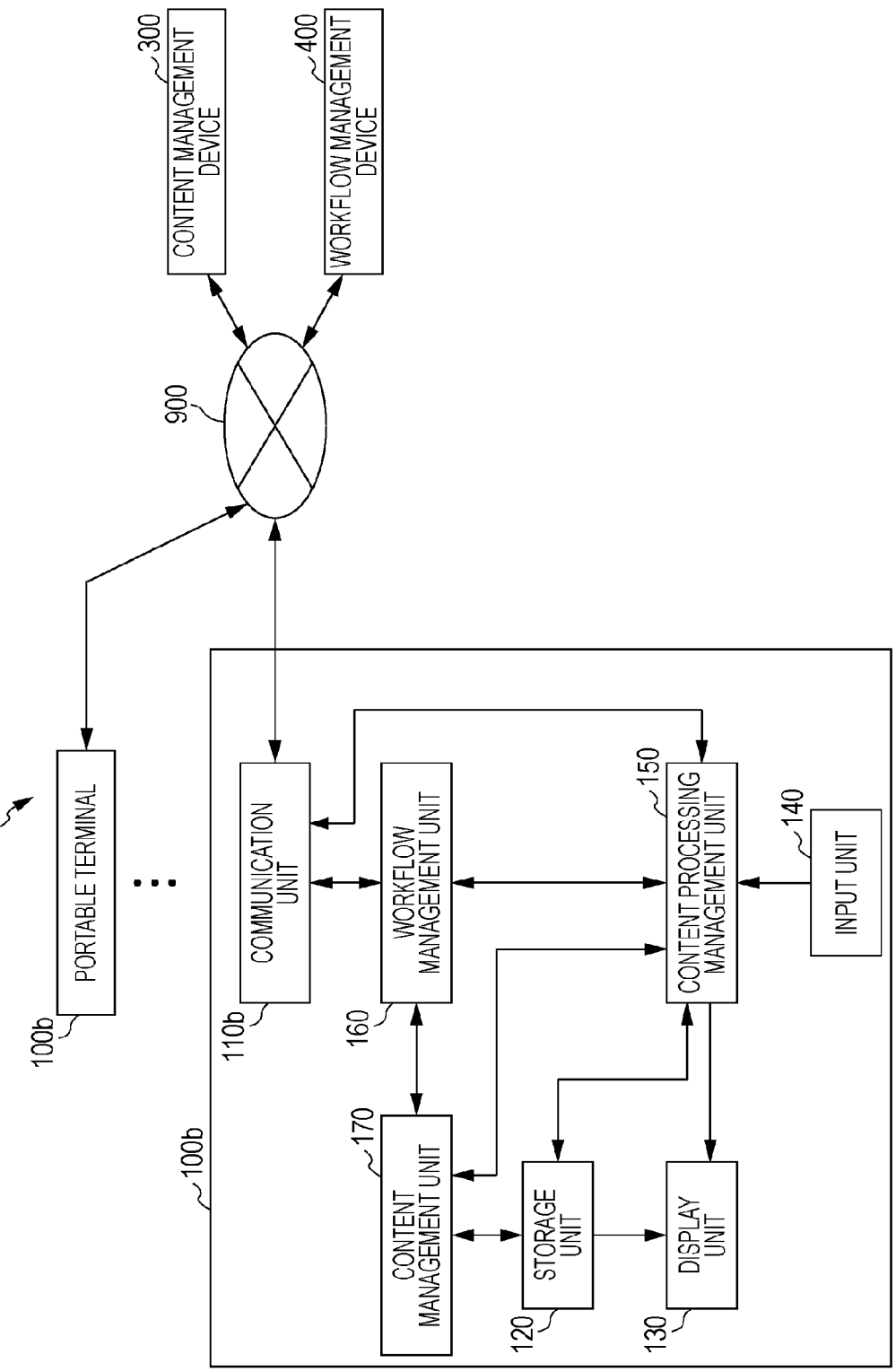
FIG. 8 is a block diagram showing a configuration of a content processing system according to a second embodiment of the invention.

Referring to FIG. 8, the content processing system 2 according to the second embodiment of the invention is different from the content processing system 1 according to the first embodiment of the invention in the fact that the content processing system 2 includes a portable terminal 100b instead of the portable terminal 100 and the PC 200 according to the first embodiment, and the content processing system 2 is configured in the same manner as that of the content processing system 1 according to the first embodiment in points other than these.

The content processing system 2 is a system for performing a process on contents, stored in the content management device 300, according to a workflow using the portable terminal 100b by a plurality of users.

The content processing system 2 includes a plurality of portable terminals 100b, the content management device 300, and the workflow management device 400. Each of the plurality of portable terminals 100b is configured to be capable of connecting to the content management device 300 and the workflow management device 400 through a network 900.

The portable terminal 100b is different from the above described portable terminal 100 according to the first embodiment in the facts that the communication unit 100b is provided instead of the communication unit 110 according to the first embodiment, and the portable terminal 100b further includes the workflow management unit 160 and the content management unit 170, and the portable terminal 100b is configured in the same manner as that of the portable terminal 100 according to the first embodiment in points other than these.

The communication unit 110b has a communication interface, and performs communication with the content management device 300 and the workflow management device 400 through the network 900.

The workflow management unit 160 is made from, for example, a CPU, an RAM, an ROM, or the like, and manages a workflow in which a process is performed using the portable terminal 100b. For example, the workflow management unit manages a processing state of a process to be performed using the portable terminal 100b in the workflow, or acquires, from the workflow management device 400, information associated with the contents for which the process is to be performed and the related contents or storage destination information indicating a storage location storing the processed contents and the related contents. In addition, the workflow management unit 160 transmits the acquired information to the content processing management unit 150b.

The content management unit 170 is made from, for example, a CPU, an RAM, an ROM, or the like, and acquires the contents and the related contents from the content management device 300, and temporarily preserves or stores the acquired contents in the storage unit 120. In addition, the content management unit 170 stores, in the content management device 300 through the communication unit 110b, the processed contents and the related contents which are temporarily preserved or stored in the storage unit 120. In addition, the content management unit 170 erases the processed contents and the related contents which are temporarily preserved or stored in the storage unit 120, in response to an instruction from the workflow management unit 160.

Next, the operation of the content processing system according to the second embodiment will be described with reference to FIGS. 9 and 10, in addition to FIG. 8.

Figure 9:
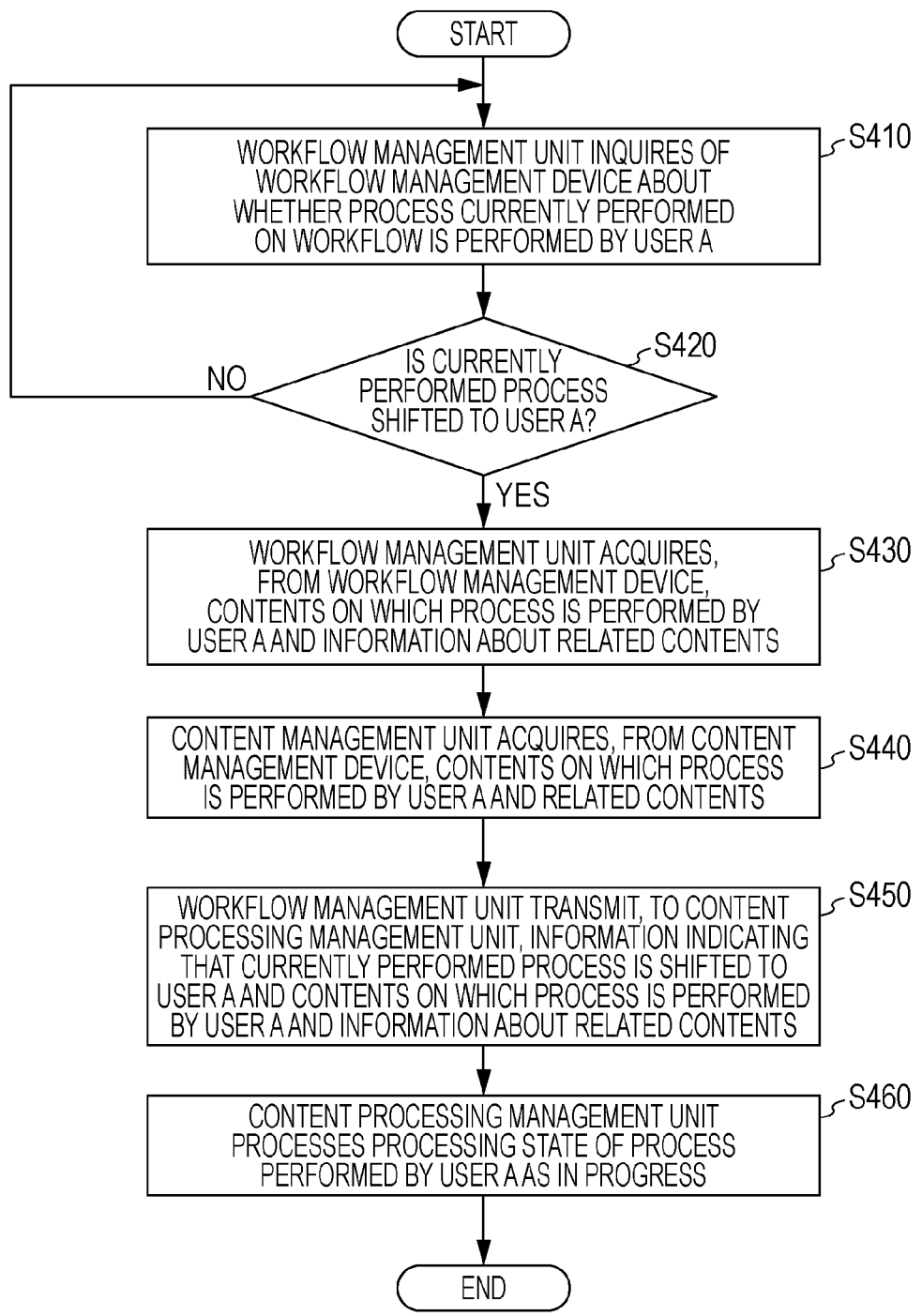
FIG. 9 is a flowchart for describing a first operation example of a content processing system according to a second embodiment of the invention.

FIG. 9 is a flowchart for describing a first operation example of the content processing system 2 according to a second embodiment of the invention.

Referring to FIG. 9, as the first operation example of the content processing system 2, operations when the process to be currently performed in a workflow managed by the workflow management device 400 is moved to a user A of a plurality of users are shown. In addition, in the following description, the portable terminal 100b is provided to correspond to the user A.

Referring to FIG. 9, first, the workflow management unit 160 inquires of the workflow management device 400 through the communication unit 110b and the network 900 about whether the process to be currently performed in the workflow is a process to be performed by the user A (Step S410). Next, the workflow management unit 160 determines whether the process to be currently performed in the workflow is moved to the user A based on the response from the workflow management device 400 (Step S420).

When the process to be currently performed is determined not to be moved to the user A, that is, when the process to be currently performed is a process to be performed by another user other than the user A of the plurality of users (Step S420: No), the workflow management unit 160 repeatedly inquires of the workflow management device 400 about whether the process to be currently performed in the workflow is the process to be performed by the user A after a predetermined period of time (Step S410).

When the process to be currently performed is determined to have moved to the user A, that is, when the process to be currently performed is the process to be performed by the user A (Step S420: Yes), the workflow management unit 160 acquires, from the workflow management device 400, information (for example, names of the contents and the related contents or storage location in the content management device 300) associated with the contents on which processing is to be performed by the user A and the related contents (Step S430). In this instance, the workflow management unit 160 transmits, to the content management unit 170, "information associated with the contents on which processing is to be performed by the user A and the related contents". Also, the workflow management unit 160 gives, to the content management unit 170, an instruction indicating that the contents on which processing is to be performed by the user A and the related contents are to be acquired from the content management device 300.

Next, the content management unit 170 acquires, from the content management device 300 through the communication unit 110b and the network 900, the contents on which processing is to be performed by the user A and the related contents based on the "information associated with the contents on which processing is to be performed by the user A and the related contents" transmitted from the workflow management unit 160 (Step S440). In this instance, the content management unit 170 preserves or stores the acquired contents and related contents in the storage unit 120.

Next, the workflow management unit 160 transmits, to the content processing management unit 150, information indicating that the process to be currently performed is moved to the user A and the "information associated with the contents on which processing is to be performed by the user A and the related contents" (Step S450).

Next, the content processing management unit 150 processes a processing state of the process to be performed by the user A as "in progress" (Step S460).

Thereafter, for example, the user A carries the portable terminal 100b, and performs a process of the contents using the portable terminal 100b.

Here, according to the embodiment of the invention, particularly, when the process to be currently performed in the workflow is moved to the user A (Step S420: Yes), the contents on which processing is to be performed by the user A and the related contents are stored in the portable terminal 100b corresponding to the user A (Steps S430 and S440). In addition, the workflow management unit 160 and the content management unit 170 configure an example of the "first executing unit" of the invention.

Thus, it is possible to reduce time and effort of the user A required for storing the contents and the related contents from the content management device 300 to the portable terminal 100b when a process is performed by the user A using the portable terminal 100b.

Figure 10:
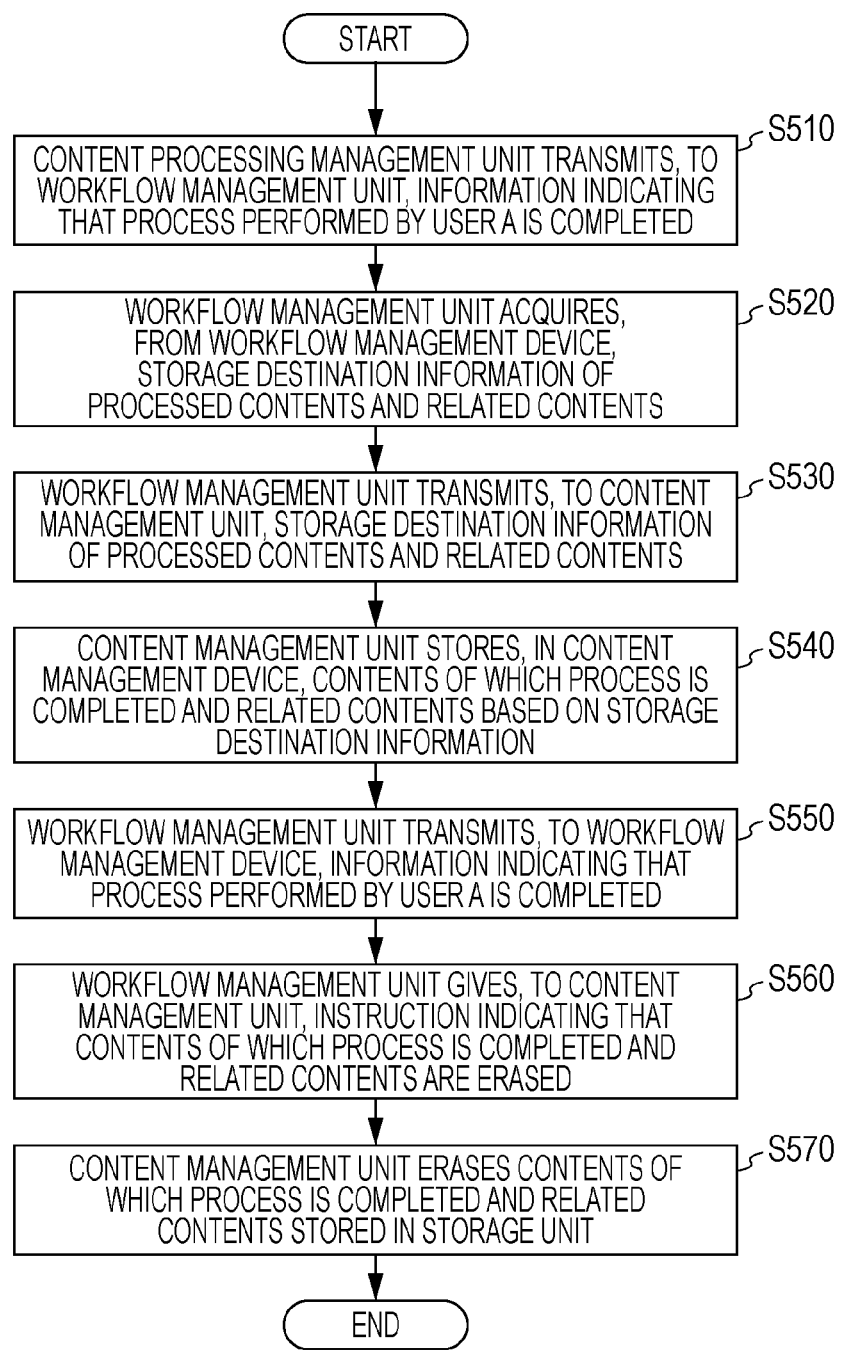
FIG. 10 is a flowchart for describing a second operation example of a content processing system according to a second embodiment of the invention.

FIG. 10 is a flowchart for describing a second operation example of a content processing system 2 according to a second embodiment of the invention.

In FIG. 10, as the second operation example of the content processing system 2, operations after a process to be currently performed in a workflow is moved to a user A, and the user A performs the process using the portable terminal 100b are shown.

In FIG. 10, when information indicating that the process is completed is input to the input unit 140 by the user A, the content processing management unit 150 transmits, to the workflow management unit 160, information indicating that the process to be performed by the user A is completed (Step S510).

Next, the workflow management unit 160 acquires, from the workflow management device 400, storage destination information of the processed contents and the related contents (that is, information indicating a storage location in the content management device 300 where the processed contents and the related contents are stored) (Step S520).

Next, the workflow management unit 160 transmits, to the content management unit 170, the storage destination information of the processed contents and the related contents (Step S530). In this instance, the workflow management unit 160 gives, to the content management unit 170, an instruction indicating that the processed contents and the related contents are to be stored in the content management device 300.

Next, the content management unit 170 stores, in the content management device 300, the processed contents and the related contents preserved in the storage unit 120 according to the storage destination information, in response to the instruction given from the workflow management unit 240 in the step S530 (Step S540).

Next, the workflow management unit 160 transmits, to the workflow management device 400, information indicating that the process to be performed by the user A is completed (Step S550). In response to this, the workflow management device 400 shifts the process to be currently performed in the workflow to the next process, that is, moves the user to currently perform the process on the contents in the workflow, from the user A to the next user.

Next, the workflow management unit 160 gives, to the content management unit 170, an instruction indicating that the processed contents and the related contents preserved in the storage unit 120 are to be erased (Step S560).

Next, the content management unit 170 erases the processed contents and the related contents preserved in the storage unit 120, in response to the instruction given from the workflow management unit 160 in step S560 (Step S570).

Here, according to the embodiment of the invention, particularly, when the process to be performed by the user A is completed (Step S510), the processed contents for which the process is performed by the user A and the related contents are stored in the content management device 300 by the content management unit 170 (Step S540). Thus, it is possible to reduce or eliminate laboriousness of storing the processed contents and the related contents in the content management device 300 after the user A performs the process on the contents. In addition, it is possible to reduce the time after the process is performed on the contents before the processed contents and the related contents are stored in the content management device 300. In addition, the workflow management unit 160 and the content management unit 170 configure an example of the "second executing unit" of the invention.

In addition, according to the embodiment of the invention, particularly, the content management unit 170 erases the processed contents and the related contents preserved in the storage unit 120, in response to the instruction from the workflow management unit 160 (Step S570). Thus, it is possible to reduce or eliminate laboriousness of managing the processed contents and the related contents by the user A using the portable terminal 100b. In addition, it is possible to avoid pressure on the storage capacity of the storage unit 120 of the portable terminal 100b from the processed contents and the related contents. The workflow management unit 160 and the content management unit 170 configure an example of the "erasing unit" of the invention.

The invention shall not be limited to the above described embodiments, and may be suitably modified in scope without departing from the principles and spirit of the disclosure that can be read from the scope of the claims and the entire specification. The content processing system, the content processing method, the computer program, the recording medium, and the portable terminal which accompany the modification are included in the scope of the invention.

The entire disclosure of Japanese Patent Application No. 2010-047033, filed Mar. 3, 2010 is expressly incorporated by reference herein.

What is claimed is:

1. A content processing system that includes a content management device storing contents and information associated with the contents, and a plurality of portable terminals capable of accessing the content management device through a network, the plurality of portable terminals including a first portable terminal and a second portable terminal and performing a process on the contents according to a workflow, the content processing system comprising:
  a first executing unit that let at least a part of the contents and the associated information be stored in the first portable terminal to perform a second process when the process to be currently performed in the workflow is moved from a first process to the second process;
  a second executing unit that lets at least a part of processed contents and processed associated information be stored in the content management device, the processed contents and the processed associated information being processed using the first portable terminal during the second process;
  an erasing unit that erases, from the first portable terminal, the processed contents and the processed associated information stored in the first portable terminal, when the at least a part of the processed contents and the processed associated information is stored in the content management device by the second executing unit; and
  a third executing unit that lets at least a part of the processed contents and the processed associated information be stored in the second portable terminal to perform a third process when the process to be currently performed in the workflow is moved from the second process to the third process.

2. The content processing system according to claim 1, wherein, when the process is performed on the contents by the first portable terminal, the second executing unit let post-processing information be stored in the content management device as the processed associated information, wherein the post-processing information indicate changes in the contents due to the performed process.

3. The content processing system according to claim 1, further comprising:
  a fixed terminal that is provided to correspond to at least one of the plurality of portable terminals and functions as at least a part of the first executing unit, the second executing unit, the erasing unit, and the third executing unit.

4. The content processing system according to claim 1, wherein each of the plurality of portable terminals has an associating unit that associates at least one of a handwritten character, a highlighted display, and an electronic tag with the contents as associated information.

5. The content processing system according to claim 1, wherein each of the plurality of portable terminals has a display unit that is formed of an electronic paper for displaying the contents.

6. The content processing system according to claim 1, wherein each of the plurality of portable terminals has at least one of a function of encrypting information, a function of decrypting information, a function of performing device authentication, a function of performing biometric authentication, and a function of performing password authentication.

7. A content processing method for performing a process on contents according to a workflow using a plurality of portable terminals including a first portable terminal and a second portable terminal, the content processing method comprising:
  storing at least a part of the contents and the associated information of the contents in the first portable terminal to perform a second process when the process to be currently performed in the workflow is moved from a first process to the second process;
  storing at east a part of processed contents and processed associated information in the content management device, the processed contents and the processed associated information being processed using the first portable terminal during the second process;
  erasing, from the first portable terminal, the processed contents and the processed associated information stored in the first portable terminal, when the at least a part of the processed contents and the processed associated information is stored in the content management device; and
  storing at least a part of the processed contents and the processed associated information in the second portable terminal to perform a third process when the process to be currently performed in the workflow is moved from the second process to the third process.

8. A computer program that controls a computer included in the content processing system described in claim 1, the computer program enabling the computer to function as the first executing unit.

9. A recording medium in which the computer program described in claim 8 is recorded to read by a computer.

* * * * *